(12) United States Patent
Fenton

(10) Patent No.: US 12,291,284 B2
(45) Date of Patent: *May 6, 2025

(54) STAMPED REAR FRAME BOLSTER

(71) Applicant: STI Holdings, Inc., Stoughton, WI (US)

(72) Inventor: Gary L. Fenton, Edgerton, WI (US)

(73) Assignee: STI Holdings, Inc., Stoughton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/627,990

(22) Filed: Apr. 5, 2024

(65) Prior Publication Data

US 2024/0246618 A1    Jul. 25, 2024

Related U.S. Application Data

(63) Continuation of application No. 17/357,513, filed on Jun. 24, 2021, now Pat. No. 11,975,767, which is a
(Continued)

(51) Int. Cl.
*B62D 33/04* (2006.01)
*B21D 22/02* (2006.01)
(Continued)

(52) U.S. Cl.
CPC ......... *B62D 33/046* (2013.01); *B60Q 1/2619* (2013.01); *B62D 33/04* (2013.01);
(Continued)

(58) Field of Classification Search
CPC ....... B60R 19/56; B60R 19/445; B60R 19/44; B60R 2019/182; B60R 2019/1826; B62D 33/044; B62D 33/046
(Continued)

(56) References Cited

U.S. PATENT DOCUMENTS 1,592,667 A      7/1926  Lewis
2,194,042 A  *   3/1940  Wyatt ................ B60R 19/50
                                              40/200
(Continued)

FOREIGN PATENT DOCUMENTS

CN    100402177 C       7/2008
CN    202271938 U   *   6/2012
(Continued)

OTHER PUBLICATIONS

"New Safety Measures for Preventing Underride Fatalities", Website, David Law Firm, San Antonia, TX, https://jeffdavislawfirm.com/truck-underride-accidents-safety/, (6 pages).
(Continued)

*Primary Examiner* — Amy R Weisberg
*Assistant Examiner* — Veronica M Shull
(74) *Attorney, Agent, or Firm* — Michael Best & Friedrich LLP

(57) ABSTRACT

A cargo transport rear frame includes a par of posts spaced apart in a width direction, an upper cross member extending along the width direction between respective upper ends of the pair of posts, and a rear bolster extending along the width direction between respective lower ends of the pair of posts. The rear bolster has a first side facing in a forward direction that is perpendicular to both the width and height directions, and the rear bolster has a second side facing in a rearward direction to be exposed to a rear side of the cargo transport rear frame. The rear bolster comprises a sheet metal stamping including a base surface and a relief embossed in the rearward direction from the base surface to form a loading dock engagement feature configured to withstand repeated loading dock impacts.

20 Claims, 10 Drawing Sheets

Related U.S. Application Data continuation of application No. 16/564,533, filed on Sep. 9, 2019, now Pat. No. 11,110,972, which is a continuation-in-part of application No. 16/532,807, filed on Aug. 6, 2019, now Pat. No. 11,072,369.

(60) Provisional application No. 62/715,648, filed on Aug. 7, 2018.

(51) Int. Cl.
*B60Q 1/26* (2006.01)
*B60Q 1/30* (2006.01)

(52) U.S. Cl.
CPC ............... *B21D 22/02* (2013.01); *B60Q 1/30* (2013.01); *B60Y 2200/147* (2013.01); *B60Y 2200/148* (2013.01)

(58) Field of Classification Search
USPC ............ 296/182.1, 184.1; 293/141, 142, 102
See application file for complete search history.

(56) References Cited

U.S. PATENT DOCUMENTS

| | | | |
|---|---|---|---|
| 3,871,695 A | 3/1975 | Koenig | |
| D249,500 S | 9/1978 | Cox | |
| 4,169,623 A | 10/1979 | Smith | |
| 4,211,444 A | 7/1980 | Glassmeyer | |
| 4,359,239 A | 11/1982 | Eggert et al. | |
| D269,423 S | 6/1983 | Waite | |
| 5,507,546 A | 4/1996 | Holley | |
| 5,632,518 A | 5/1997 | Kendall | |
| 5,673,953 A | 10/1997 | Spease | |
| D398,264 S | 9/1998 | Fetz et al. | |
| D418,095 S | 12/1999 | Reitnouer | |
| 6,076,871 A | 6/2000 | Jarvis et al. | |
| 6,360,441 B1 | 3/2002 | Himsl et al. | |
| D458,565 S | 6/2002 | Maher et al. | |
| 6,652,010 B1 | 11/2003 | Huddle et al. | |
| D483,697 S | 12/2003 | Hicks | |
| 6,764,116 B2 | 7/2004 | Ledford et al. | |
| 6,974,166 B2 | 12/2005 | Ledford et al. | |
| 7,007,988 B1 | 3/2006 | Doyle | |
| 7,025,396 B2 * | 4/2006 | Omura | B60R 19/18 293/121 |
| 7,703,820 B2 * | 4/2010 | Perarnau Ramos | B60R 19/18 293/155 |
| 8,096,595 B2 | 1/2012 | Muskos | |
| 8,100,465 B2 | 1/2012 | Wylezinski | |
| D703,106 S | 4/2014 | Deighton | |
| 8,714,792 B2 | 5/2014 | Adams | |
| 9,114,768 B2 * | 8/2015 | Taniguchi | B60R 19/56 |
| 9,199,594 B2 | 12/2015 | Musale et al. | |
| 9,527,465 B2 | 12/2016 | Johnson et al. | |
| 9,555,755 B2 | 1/2017 | Franiak et al. | |
| 9,566,923 B2 | 2/2017 | Wylezinski et al. | |
| D790,407 S | 6/2017 | Miller et al. | |
| 9,771,040 B2 | 9/2017 | Miller et al. | |
| 9,783,144 B2 * | 10/2017 | Miller | B60R 19/56 |
| 9,908,453 B2 | 3/2018 | McKibben et al. | |
| 9,914,389 B2 | 3/2018 | Ehrlich et al. | |
| 10,071,700 B1 | 9/2018 | Ghannam et al. | |
| 10,093,254 B2 * | 10/2018 | Asplund | B60R 19/18 |
| 10,173,620 B2 | 1/2019 | Tang et al. | |
| 10,179,559 B2 | 1/2019 | Ghannam et al. | |
| 10,272,859 B2 | 4/2019 | Miller et al. | |
| 10,369,949 B2 | 8/2019 | Miller | |
| D864,038 S | 10/2019 | Miller et al. | |
| 10,640,068 B2 | 5/2020 | Miller | |
| D889,320 S | 7/2020 | Miller et al. | |
| 10,787,142 B2 | 9/2020 | Mikazuki et al. | |
| D911,912 S | 3/2021 | Fenton et al. | |
| 11,046,267 B2 * | 6/2021 | Pavlik | B60R 19/44 |
| 11,072,369 B2 * | 7/2021 | Fenton | B62D 33/046 |
| D926,824 S | 8/2021 | Hemry et al. | |
| 11,110,972 B2 * | 9/2021 | Fenton | B62D 21/03 |
| D937,714 S | 12/2021 | Veilleux et al. | |
| 11,752,961 B2 * | 9/2023 | Gauntt | B60R 19/56 293/142 |
| 11,975,767 B2 * | 5/2024 | Fenton | B62D 21/03 |
| 2004/0061357 A1 * | 4/2004 | Long | B62D 33/04 296/186.3 |
| 2006/0119116 A1 | 6/2006 | Goertz | |
| 2006/0131930 A1 | 6/2006 | Long et al. | |
| 2008/0073941 A1 | 3/2008 | Wylezinski | |
| 2013/0106087 A1 | 5/2013 | Ehrlich | |
| 2013/0249223 A1 | 9/2013 | Deighton | |
| 2014/0069912 A1 | 3/2014 | Fenton | |
| 2017/0072886 A1 | 3/2017 | Wylezinski et al. | |
| 2017/0210211 A1 | 7/2017 | Clausen et al. | |
| 2018/0009401 A1 | 1/2018 | Miller et al. | |
| 2018/0345891 A1 | 12/2018 | Fetz et al. | |
| 2019/0061660 A1 | 2/2019 | Hitchcock | |
| 2019/0291669 A1 | 9/2019 | Pavlik | |
| 2019/0366964 A1 * | 12/2019 | Miller | B60R 19/24 |
| 2020/0047809 A1 | 2/2020 | Fenton et al. | |
| 2020/0047812 A1 | 2/2020 | Fenton | |
| 2020/0047822 A1 | 2/2020 | Fenton | |
| 2020/0172012 A1 | 6/2020 | Pincheon | |
| 2021/0114539 A1 | 4/2021 | McDonald, Jr. et al. | |
| 2022/0134984 A1 | 5/2022 | Gauntt et al. | |
| 2022/0242349 A1 | 8/2022 | Berger et al. | |

FOREIGN PATENT DOCUMENTS

| | | | |
|---|---|---|---|
| DE | 102018202932 B3 | 5/2019 | |
| DE | 202020103591 U1 | 6/2021 | |
| EP | 4023501 A1 | 7/2022 | |
| WO | 03004316 A1 | 1/2003 | |

OTHER PUBLICATIONS

Stoughton Trailers, Rear Frame and Rear Cross Member Assembly, products in commerce and publicly available Dec. 2016, representative production drawings and statement of relevance attached (6 pages).

Ontario Trucking Association, "US Bill Would Require Trailer Underride Guards, Bolster Rear Guards," <https://ontruck.org/us-bill-would-require-trailer-underride-guards-bolster-rear-guards/> article dated Dec. 13, 2017.

Stoughton Trailers, "Rear Impact Guard," <https://www.stoughtontrailers.com/products/rear-impact-guard#7172-specifications> web page visited Oct. 7, 2021.

* cited by examiner

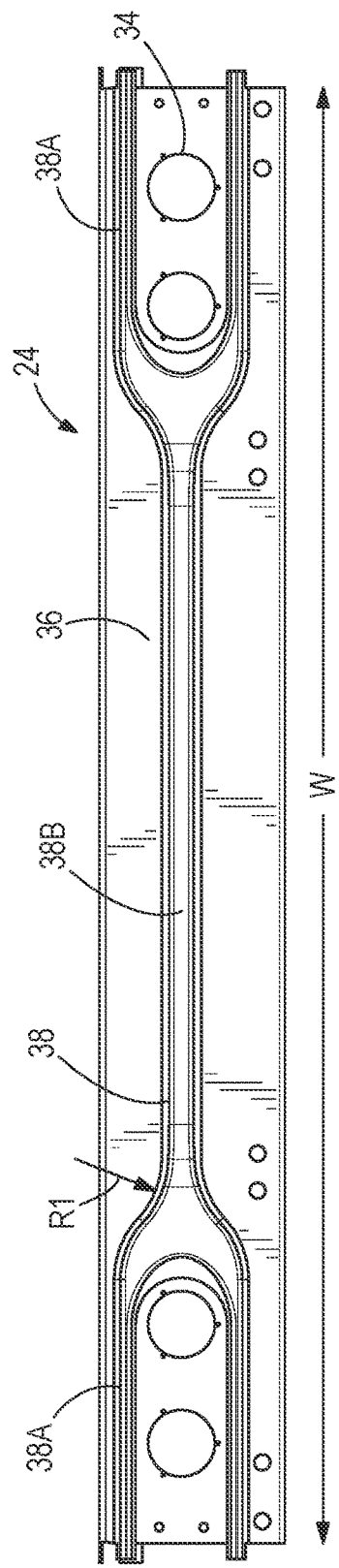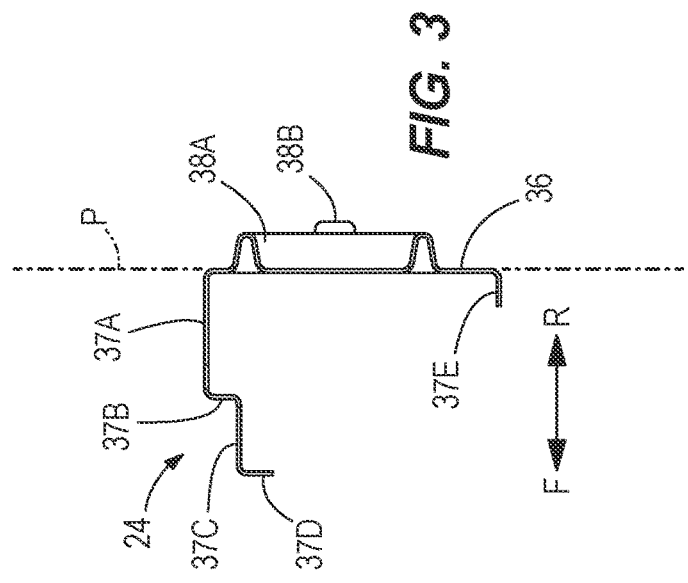

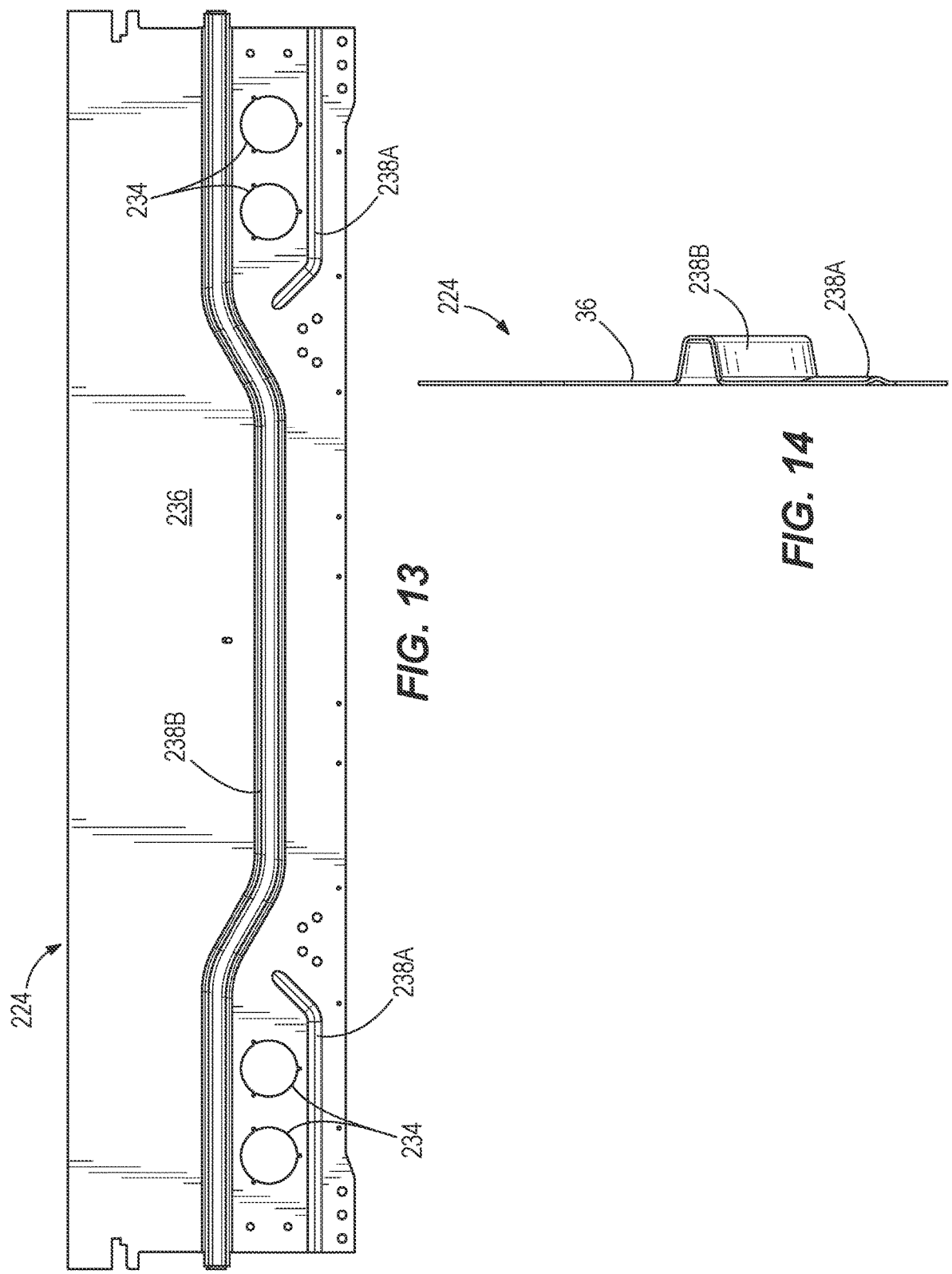

STAMPED REAR FRAME BOLSTER

CROSS-REFERENCE TO RELATED APPLICATIONS

This application is a continuation of U.S. patent application Ser. No. 17/357,513, filed Jun. 24, 2021, which is a continuation of U.S. patent application Ser. No. 16/564,533, filed Sep. 9, 2019, which is a continuation-in-part of U.S. patent application Ser. No. 16/532,807, filed Aug. 6, 2019, which claims priority to U.S. Provisional Patent Application No. 62/715,648, filed Aug. 7, 2018, the entire contents of all of which are incorporated by reference herein.

BACKGROUND

The disclosure relates to the construction of cargo transports, such as vehicles for over-the-road freight hauling. These may include enclosed and open trailers (e.g., semi-trailers), box trucks, and vans, for example. The disclosure further relates to rear frames thereof.

SUMMARY

In one aspect, the present disclosure provides a cargo transport rear frame defining a rear cargo opening. The cargo transport rear frame includes a par of posts spaced apart in a width direction, each of the par of posts extending in a height direction, an upper cross member extending along the width direction between respective upper ends of the pair of posts, and a rear bolster extending along the width direction between respective lower ends of the pair of posts such that the rear bolster is spaced below the upper cross member in the height direction. The pair of posts, the upper cross member, and the rear bolster bound the rear cargo opening. The rear bolster has a first side facing in a forward direction that is perpendicular to both the width and height directions, and the rear bolster has a second side facing in a rearward direction to be exposed to a rear side of the cargo transport rear frame. The rear bolster comprises a sheet metal stamping including a base surface and a relief embossed in the rearward direction from the base surface to form a loading dock engagement feature configured to withstand repeated loading dock impacts.

In another aspect, the present disclosure provides a rear bolster for a cargo transport rear frame. The rear bolster includes a sheet metal stamping including a base surface having lateral outboard ends spaced in a width direction and having a top edge and a bottom edge spaced in a height direction, a first side facing in a forward direction that is perpendicular to both the width and height directions, a second side facing in a rearward direction to be exposed to a rear side of the cargo transport rear frame having the rear bolster, and a relief embossed in the rearward direction from the base surface to form a loading dock engagement feature configured to withstand repeated loading dock impacts.

In yet another aspect, the present disclosure provides a rear bolster for a cargo transport rear frame. The rear bolster includes a base surface having lateral outboard ends spaced in a width direction and having a top edge and a bottom edge spaced in a height direction, a first side facing in a forward direction that is perpendicular to both the width and height directions, a second side facing in a rearward direction to be exposed to a rear side of the cargo transport rear frame having the rear bolster, and a relief embossed in the rearward direction from the base surface to form a loading dock engagement feature configured to withstand repeated loading dock impacts. The loading dock engagement feature includes a central portion extending further in the rearward direction than a remainder of the relief.

BRIEF DESCRIPTION OF THE DRAWINGS

FIG. 2 is a rear view of the stamped rear bolster.

FIG. 3 is an end view of the stamped rear bolster.

FIG. 13 is a front view of the stamped rear bolster of FIG. 10 prior to final forming.

FIG. 14 is an end view of the stamped rear bolster as shown in FIG. 13.

DETAILED DESCRIPTION

Figure 1:
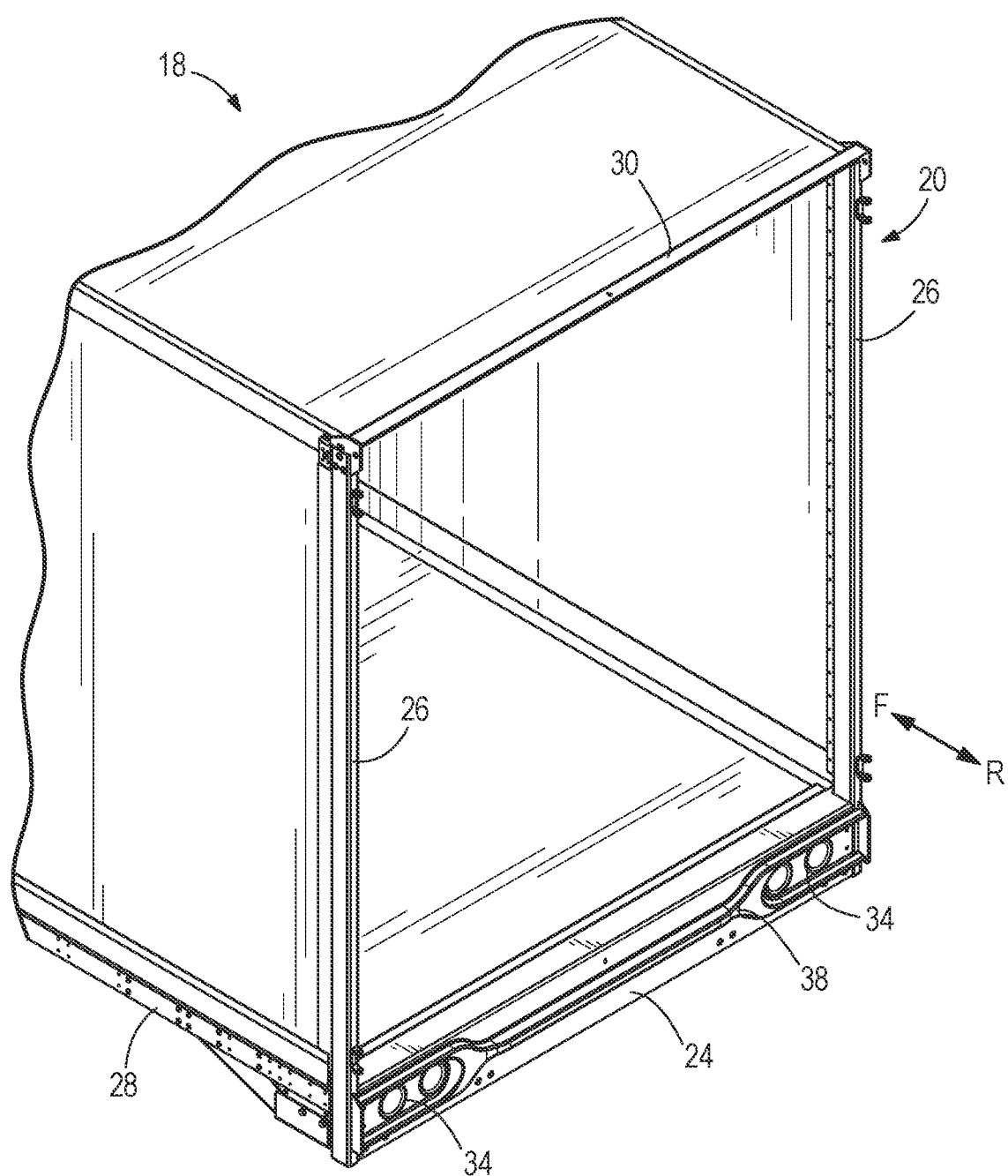
FIG. 1 is a perspective view of a rear portion of a cargo transport including a stamped rear bolster according to one embodiment of the present disclosure.
Figure 4:
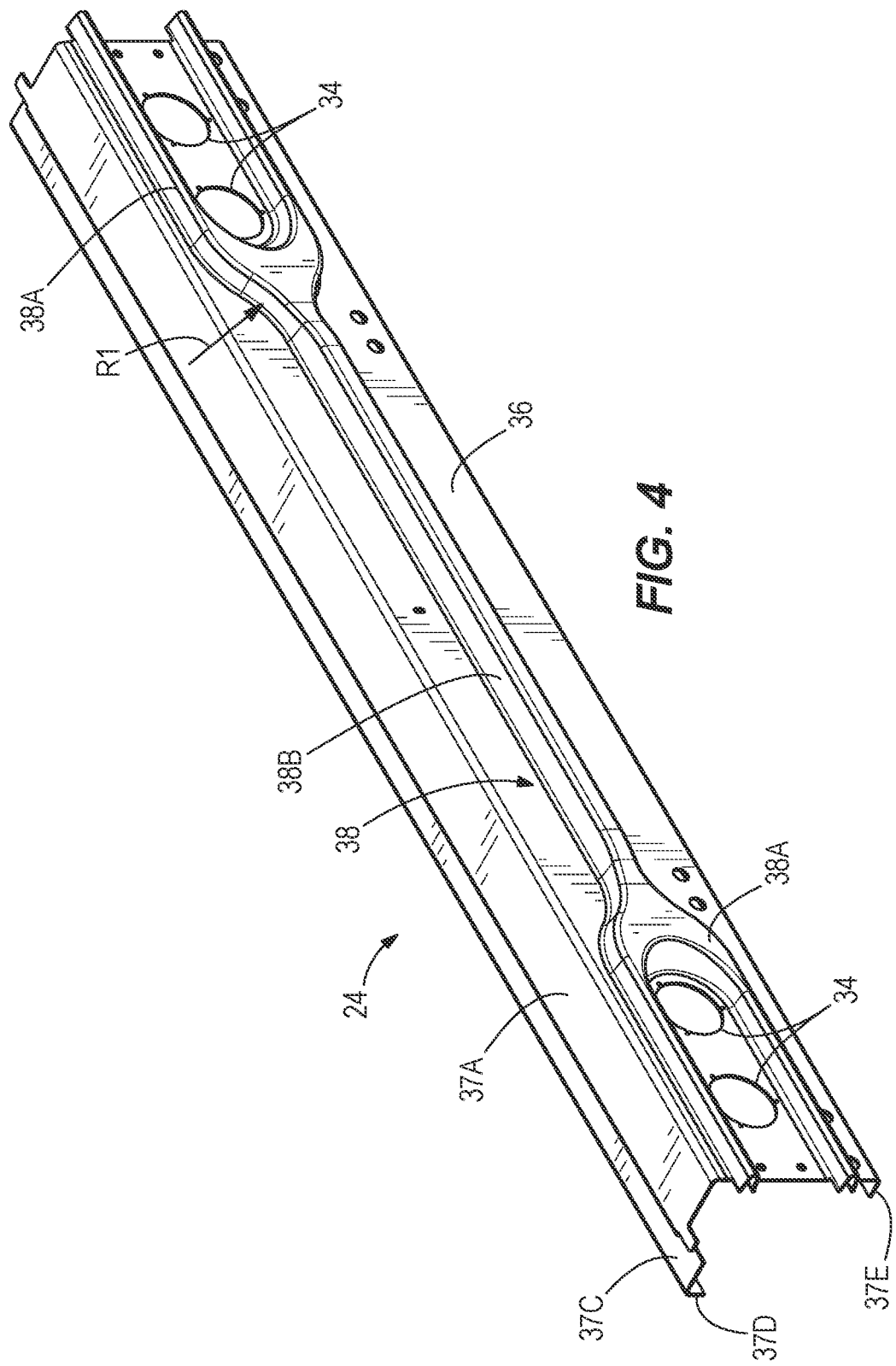
FIG. 4 is a perspective view of the stamped rear bolster.

FIG. 1 illustrates a rear portion of a cargo transport such as a trailer 18. For example, the cargo transport 18 can be a semi-trailer or other over-the-road cargo hauler (e.g., for attachment with a road tractor in forming a so-called 18-wheeler). The illustrated cargo transport 18 is an enclosed semi-trailer having a load floor for receiving and supporting cargo for transport, front, left side, and right side walls extending upward from the load floor, a roof extending over the load floor, and a rear opening selectively closeable by one or more doors (not shown). The cargo transport 18 can have a length of 53 feet, although the cargo transport 18 can have a length greater than or less than 53 feet in other constructions. Aspects of the invention may not be limited to enclosed semi-trailers as illustrated, and it will be understood that features described herein may also apply to many other types of cargo transports. The cargo transport 18 has a rear frame 20 including a rear bolster 24, a pair of vertical posts 26, and an upper cross member 30. The vertical posts 26 are laterally spaced to define a width W of the rear frame 20. The rear bolster 24 spans between the vertical posts 26 at their lower ends. The upper cross member 30 spans between the vertical posts 26 at their upper ends, generally parallel to and above the rear bolster 24. A rear cargo opening into the cargo volume of the cargo transport 18 is defined by the rear frame 20. The door(s) can be supported on the rear frame 20. The rear bolster 24 can be positioned at the bottom rear edge of the cargo area and a bottom rear edge of the rear frame 20. The character F indicates the forward direction, and the character R indicates the rearward direction. Longitudinal bottom rails 28 extend forwardly from the rear bolster 24 along the length of the cargo transport 18. The vertical posts 26 can have a hollow box structure, or other suitable construction. Opposing lateral distal ends of the rear bolster 24 are secured to (e.g., welded to) the vertical posts 26, for example at the bottom ends of the respective vertical posts 26.

Figure 5:
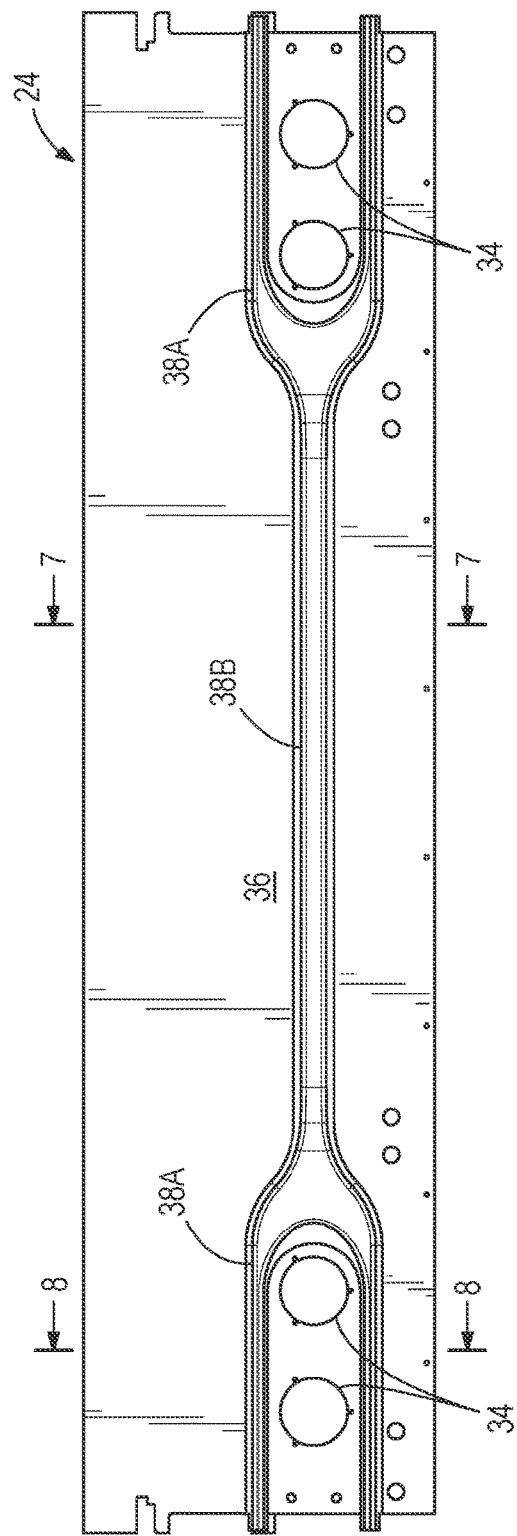
FIG. 5 is a front view of the stamped rear bolster prior to final forming.
Figure 6:
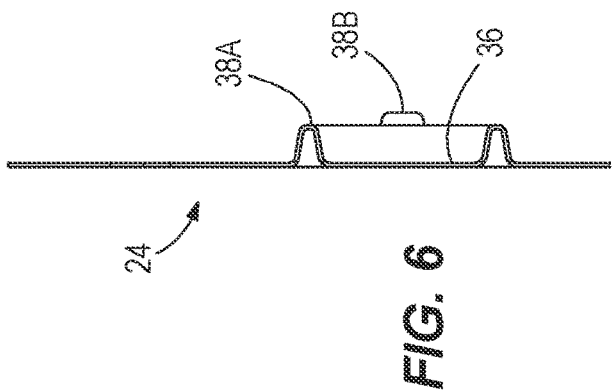
FIG. 6 is an end view of the stamped rear bolster as shown in FIG. 5.

The rear bolster 24 can be constructed as a stamped article, "a stamping," and particularly a sheet metal stamping. The rear bolster 24 can be stamped into shape, e.g., the final shape as shown in FIGS. 1-4, from a single flat metal sheet. The metal sheet can be a monolithic metal sheet having a uniform material thickness throughout (e.g., between ⅛ inch and ¼ inch, such as 8-gauge, or ¹¹⁄₆₄ inch). Exemplary materials include stainless steel, aluminum, among others. At each of the outboard ends of the rear bolster 24, there are provided multiple taillight mounts 34, which are shown as a group of two apertures, though each group may be provided with different numbers, such as three. The taillight mounts 34 are provided in a rear-facing base surface 36 of the rear bolster 24 that lies predominantly in a vertical plane P (FIG. 2). The rear bolster 24 includes additional surfaces or panels 37A-37E bent forwardly from the rear-facing base surface 36. For example, in end view (FIG. 2) it can be seen that the upper side of the rear bolster 24 includes: a first horizontal panel 37A extending forwardly from a top of the base surface 36, a first vertical panel 37B extending downwardly from the first horizontal panel 37A, a second horizontal panel 37C extending forwardly from the first vertical panel 37B, and a second vertical panel 37D extending downwardly from the second horizontal panel 37C. As illustrated, the rear bolster 24 terminates at a bottom edge of the second vertical panel 37D. An additional horizontal panel 37E extends forwardly from a bottom of the base surface 36. FIGS. 5 and 6 illustrate the rear bolster 24 prior to final forming, in a state where the additional panels 37A-37E are not yet put into place. Rather the material to form the additional panels 37A-37E lies in-plane with the base surface 36.

Furthermore, a relief 38 is stamped, or in other words pressed or embossed, into the base surface 36 to protrude therefrom. The relief 38 is raised from the base surface 36 in the rearward direction R as shown, and may generally be referred to as a dock impact or engagement feature(s). The relief 38 includes a relief portion 38A at each outboard end at least partially surrounding (e.g., above and/or below) the respective taillight mounts 34 (and the requisite taillights, once mounted). Each outboard relief portion 38A has a horizontally-extending yoke or fork shape in which upper and lower linear portions join together at an inboard side of the taillight mounts 34. The outer profile of the fork shape in each outboard relief portion 38A where the linear portions come together can define a constant or variable radius R1 (i.e., four separate radiused portions in total). In some aspects, the radius R1 is between 5 and 7 inches. In addition, the two outboard relief portions 38A can be connected to each other by a relief portion 38B in the form of a horizontally-extending channel, bar, or beam. Thus, as illustrated, the various relief portions 38A, 38B are formed as an integral stamped relief 38 in the rear bolster 24. However, the cross-sections of the various relief portions 38A, 38B are not necessarily uniform.

As shown in the end view of FIG. 2, the central relief portion 38B between the outboard relief portions 38A extends further rearward from the plane P defined by the base surface 36. Particularly, and with further reference to the cross-sections of FIGS. 7 and 8, the central relief portion 38B defines a first fore-aft depth D1 from the plane P and the outboard relief portions 38A define a second lesser fore-aft depth D2 from the plane P. As such, the central relief portion 38B between the outboard relief portions 38A may exclusively make contact with a loading dock structure of a building, or may limit the amount of contact between the loading dock structure and the outboard relief portions 38A. This can protect the outboard relief portions 38A from damage, particularly when a trailer's front end is hoisted up and/or let down while the rear bolster 24 is pressed into contact with the loading dock structure. The central relief portion 38B may extend further rearward than the outboard relief portions 38A by at least 0.40 inch (10 mm), and in some constructions at least 0.80 inch (20 mm) (e.g., less than 2 inches, in other words up to but not exceeding 50 mm). The outboard relief portions 38A may be raised from the base surface 36 such that the depth D2 is 1.0 inch (25 mm) or more (e.g., 1.4 to 1.6 inches (35 to 41 mm)). The central relief portion 38B may be raised from the base surface 36 such that the depth D1 is at least 1.6 inches (40 mm) (e.g., 1.6 to 2.4 inches (40 to 61 mm)).

Figure 7:
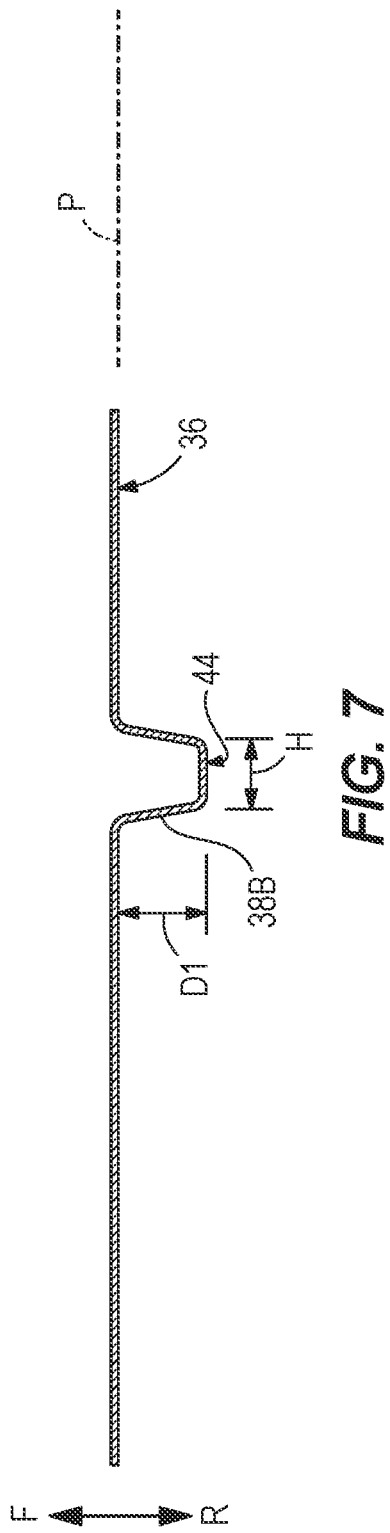
FIG. 7 is a cross-sectional view of the stamped rear bolster taken along line 7-7 of FIG. 5.
Figure 8:
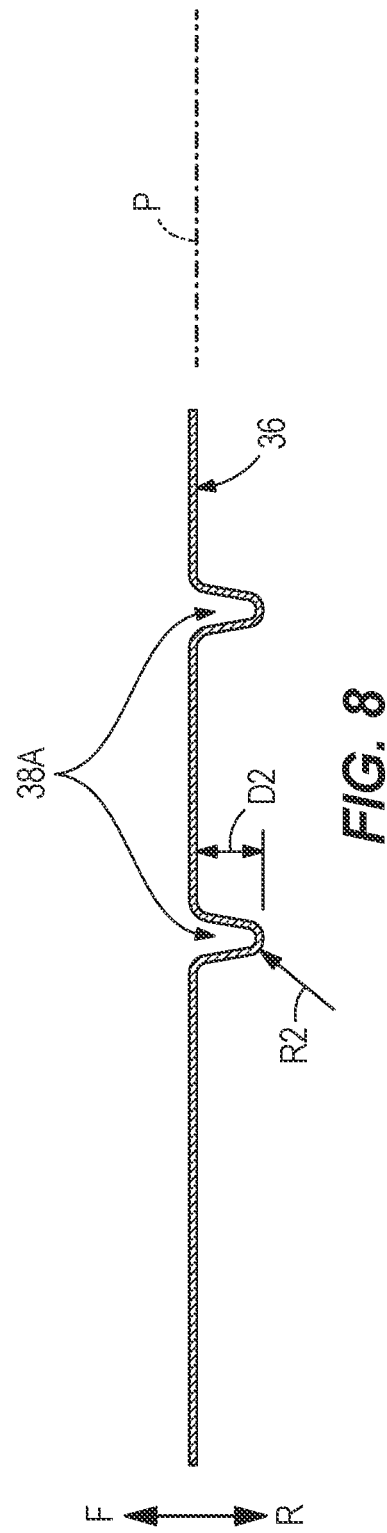
FIG. 8 is a cross-sectional view of the stamped rear bolster taken along line 8-8 of FIG. 5.

As shown in FIG. 7, the central relief portion 38B can have a flat land surface 44. The flat land surface of the central relief portion 38B can be a vertically oriented surface having a height H of 0.80 inch (20 mm) or more. In cross-section, the central relief portion 38B can be generally trapezoidal. For example, wall sections extending (e.g., extending straight) from the base surface 36 to the flat land surface 44 can be tapered to reduce in height toward the flat land surface 44. On the other hand, the outboard relief portions 38A can have a radius of curvature R2, without flat lands, at their rearward extents. The radius R2, which can be constant or variable, is between 0.2 and 0.5 inches (5 to 13 mm) in some constructions. The radius R2 can assist in easing sliding along a surface of a loading dock structure.

By stamping the relief 38 into the rear bolster 24, substantial welding labor is avoided. The relief 38, and other portions of the rear bolster 24, can be designed for handling the loading requirements of the rear frame 20, such as rear and side impact load requirements, fork lift drive-over loading, without weld-on reinforcements. Stress concentrations can be avoided by rounded corners and transitions. For example, each outboard relief 38A has the general shape of a horseshoe, open toward the outboard end, and having a rounded, closed end opposite thereof. As such, the relief 38 as a whole has a double-forked shaped, spanning the width W of the rear bolster 24. As described above, a fork shape is formed at each location where the upper and lower parts of one of the outboard relief portion 38A merge into the central relief portion 38B.

Figure 9:
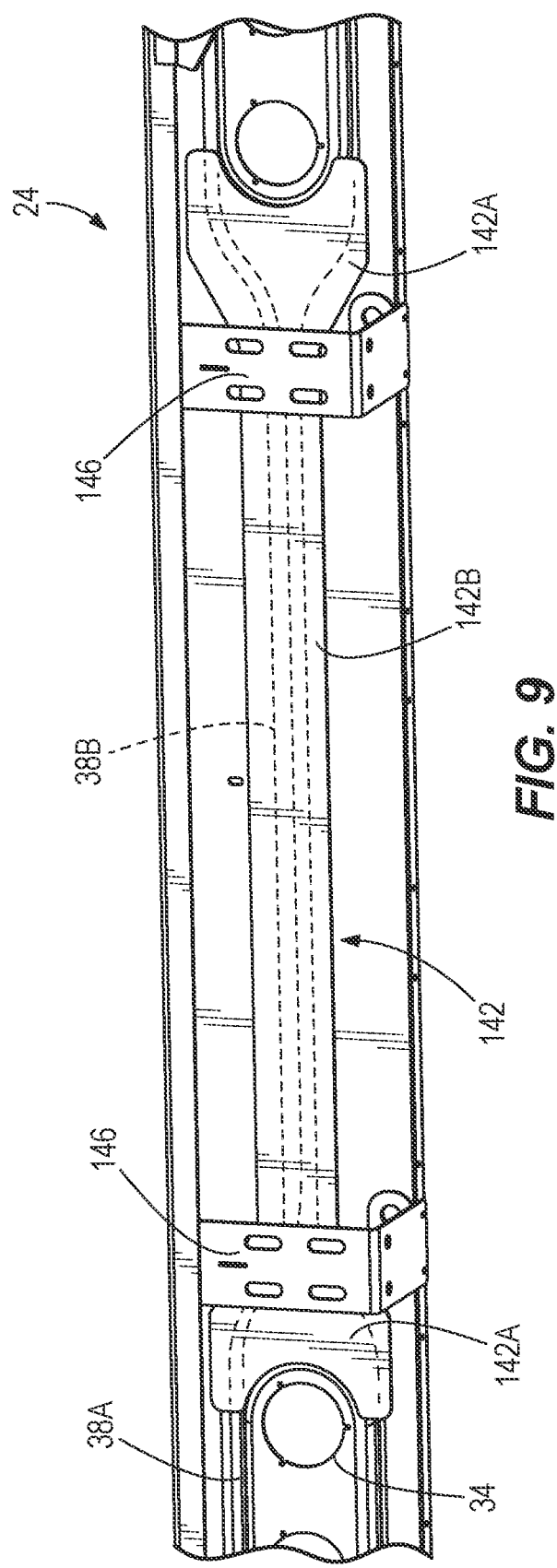
FIG. 9 is a perspective view of a front side of the stamped rear bolster having an optional backing plate.

In some constructions, an additional backing plate 142 (FIG. 9) is provided on the forward side of the rear bolster 24. The backing plate 142 can have a flat sheet or plate construction. The backing plate 142 can lie directly behind the central relief portion 38B when viewed from the rear side. The backing plate 142 can cover all or a portion of the central relief portion 38B. In addition, the backing plate 142 may cover at least a portion of each of the outboard relief portions 38A. As shown in FIG. 9, the outboard ends 142A of the backing plate 142 can be fork-shaped and can be wider in the vertical direction than the central portion 142B. The ends 142A can terminate at the respective taillight mounts 34. Additional gusseting may also be provided to reinforce the stamped rear bolster 24. For example, one or more gussets 146 are provided to span between the panels 37D and 37E of the rear bolster 24. The gusset(s) 146 and/or the backing plate 142 may be attached to the rear bolster stamping by welding at one or more individual locations. Although shown together, the gusset(s) 146 and the backing plate 142 may be used separately without the other in other constructions. Even if the backing plate 142 and/or gusset(s) 146 are utilized, so that the rear bolster is assembled from more than a single unitary, monolithic sheet, there are no reinforcing structures added to the rear bolster stamping on the rear-facing side (e.g., on the base surface 36).

FIGS. 10-14 illustrate a rear bolster 224 according to a second embodiment. The rear bolster 224 can be part of the rear frame 20 of the cargo transport 18 of FIG. 1 as a substitute for the rear bolster 24. Details of the rear frame 20 are referenced from the preceding description. Further, the rear bolster 224 can be similar in many respects to the rear bolster 24 of FIGS. 1-9, reference being made to the above description. Similar features use similar reference numbers from FIGS. 1-9, incremented with a leading "2" for the rear bolster 224, and the detailed description below focuses primarily on the features of the rear bolster 224 not previously described. It is also noted that certain features, which are common to the rear bolsters 24, 224, may be described and labeled in only one of the two embodiments.

Figure 10:
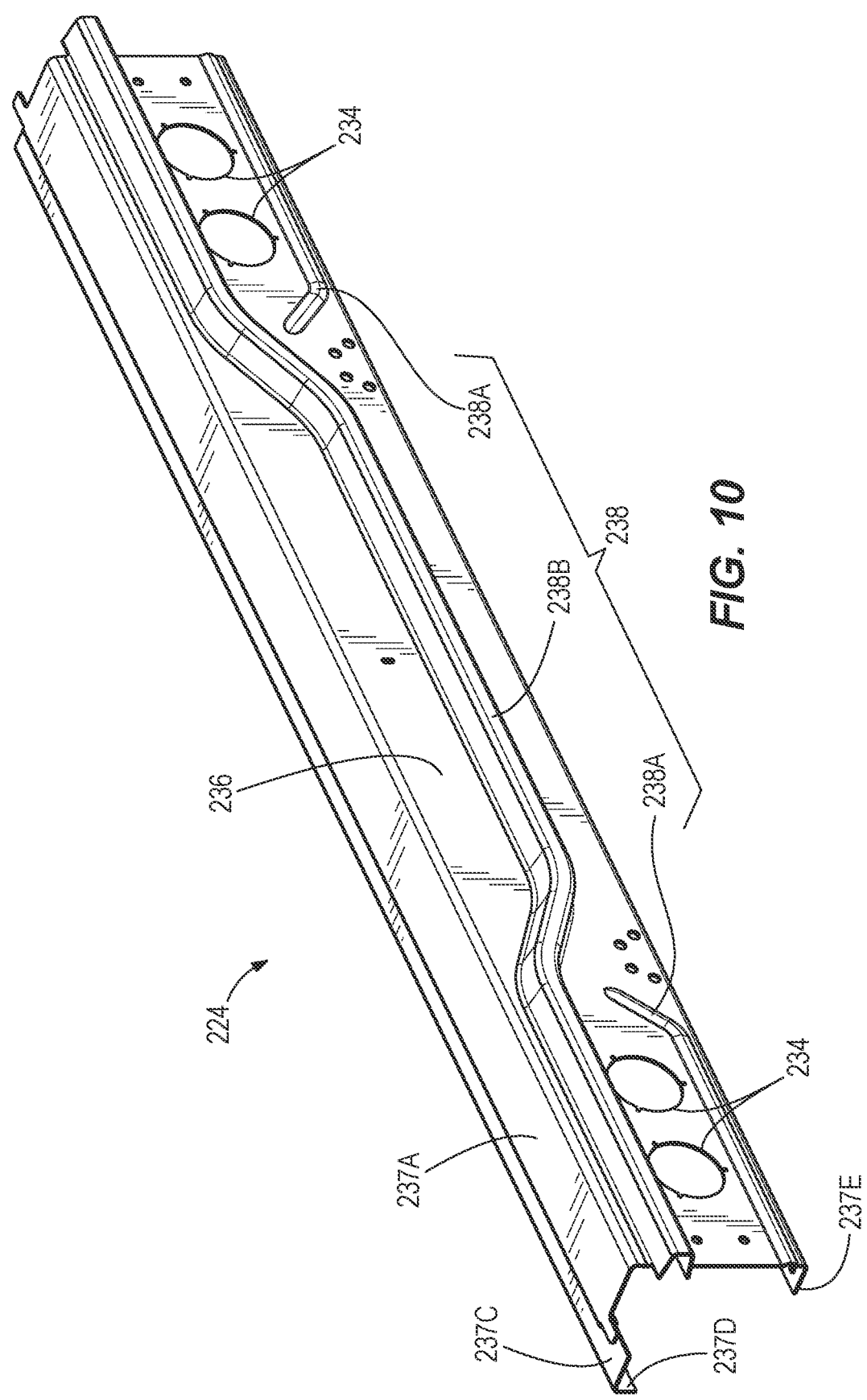
FIG. 10 is a perspective view of a stamped rear bolster according to another embodiment of the present disclosure.
Figure 11:
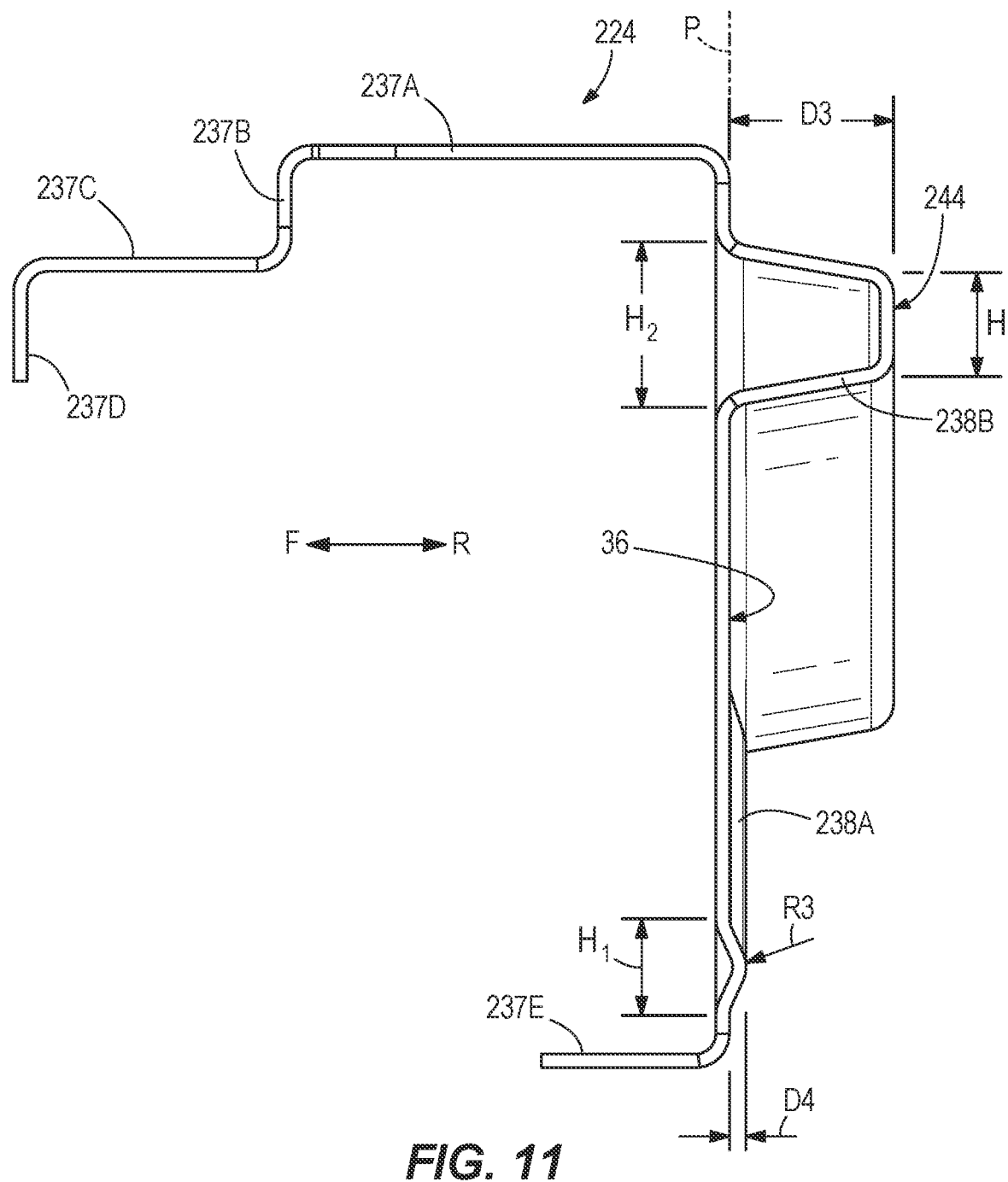
FIG. 11 is a rear view of the stamped rear bolster of FIG. 10.
Figure 12:
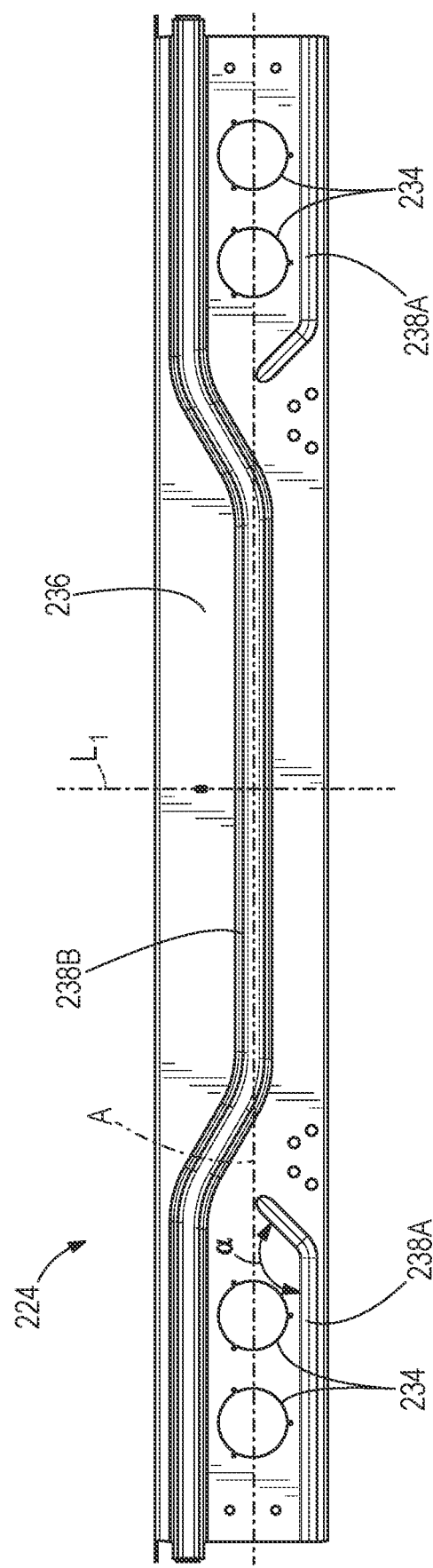
FIG. 12 is an end view of the stamped rear bolster of FIG. 10.

The rear bolster 224 can be constructed as a stamped article, stamped into the shape of FIGS. 10-12, from a single flat metal sheet. The rear bolster 224 includes a rear-facing base surface 236 that lies predominantly in a vertical plane P, and further includes additional surfaces or panels 237A-237E bent forwardly from the rear-facing base surface 236. FIGS. 13 and 14 illustrate the rear bolster 224 prior to final forming, in a state where the additional panels 237A-237E are not yet put into place. Furthermore, a relief 238 is stamped, or in other words pressed or embossed, into the base surface 236 to protrude therefrom in the rearward direction R, and may generally be referred to as a dock impact or engagement feature(s).

The relief 238 can include multiple sections or portions. As shown, the relief 238 includes a relief portion 238A at each outboard end at least partially surrounding (e.g., below) the respective taillight mounts 234 (and the requisite taillights, once mounted). The relief portions 238A can extend exclusively below a top edge of the taillight mounts 234. Each outboard relief portion 238A has a horizontally-extending two-legged shape (e.g., hockey stick shape). The two legs of the relief portion 238A can be straight segments, although curve profiles are provided in alternate constructions. The two legs of the relief portion 238A form an obtuse angle α. The angle α can be over 115 degrees in some constructions, e.g., 120 to 150 degrees. The configuration of each relief portion 238A is such that it bounds the taillight mounts 234 on the inboard side. Although shown as being entirely separate and not connected with each other, the two outboard relief portions 238A can be connected to each other. Each relief portion 238A can include a straight, horizontal section extending directly below the taillight mounts 234. The other section or leg of the relief portion 238A extends increasingly upward in a direction toward a vertical width-dividing centerline $L_1$ of the rear bolster 224.

An additional portion 238B of the relief extends widthwise across a central portion of the rear bolster 224 between the taillight mounts 234. The additional relief portion 238B can also at least partially surround (e.g., above) the taillight mounts 234. As such, the additional relief portion 238B has both central and taillight surround portions. The additional relief portion 238B extends continuously across the width W of the rear bolster 224, or at least spanning from the left side of the left taillight mounts 234 to the right side of the right taillight mounts 234. Although shown as separate and distinct from the relief portions 238A, the various relief portions 238A, 238B may be continuous or interconnected in other constructions. For example, the two relief portions 238A can be continuous or interconnected with each other, separate from the additional relief portion 238B, or one or both of the relief portions 238A may be continuous or interconnected with the additional relief portion 238B. It is also conceived to break the additional relief portion 238B into two, three, or more distinct sections, or to otherwise provide more than the three illustrated separate and distinct relief portions consisting of the two relief portions 238A and the additional relief portion 238B. Despite being separate and distinct in the illustrated construction, the additional relief portion 238B converges with each respective relief portion 238A on the inboard side of the taillight mounts 234 (e.g., mutual convergence toward each other along a direction toward the centerline $L_1$, although the convergence may be provided by just one or the other relief portion 238A or 238B in other constructions). The additional relief portion 238B has a uniform cross-section throughout. However, in other constructions, the cross-section may be non-uniform, for example like the portions of the relief 38 of FIGS. 1-9. A central portion of the additional relief portion 238B (inboard of the respective taillight mounts 234) can extend along an axis A that intersects the taillight mounts 234 on the left and right sides. The axis A can be a widthwise-extending centerline that bisects the taillight mounts 234.

As shown in the end view of FIG. 11, the additional or upper relief portion 238B extends further rearward from the plane P defined by the base surface 36 than the lower relief portions 238A that extend under the taillight mounts 234. Particularly, the additional relief portion 238B defines a first fore-aft depth D3 from the plane P and the relief portions 238A define a second lesser fore-aft depth D2 from the plane P. As such, the relief portion 238B may exclusively make contact with a loading dock structure of a building, or may limit the amount of contact between the loading dock structure and the relief portions 238A. The relief portion 238B may extend further rearward than the relief portions 238A by at least 0.40 inch (10 mm), and in some constructions at least 0.8 inch (20 mm), at least 1.0 inch (25 mm), or at least 1.4 inch (35 mm) (e.g., less than 2 inches, in other words up to but not exceeding 50 mm). The relief portions 238A may be raised from the base surface 36 such that the depth D4 is 1.0 inch (25 mm) or less (e.g., 0.08 to 0.4 inches (2 to 10 mm)). In other constructions, the depth D4 may conform to the description of the depth D2 of the rear bolster 24. The deeper relief portion 238B may be raised from the base surface 36 such that the depth D3 is at least 1.6 inches (40 mm) (e.g., 1.6 to 2.4 inches (40 to 61 mm)).

With continued reference to FIG. 11, the relief portion 238B can have a flat land surface 244, e.g., vertically-oriented. The flat land surface 244 can have a height H of 0.80 inch (20 mm) or more. A total height H1 of each of the relief portions 238A can be less than a total height H2 of the additional relief portion 238B as shown in FIG. 11. The total heights H1, H2 can be measured perpendicular to the width direction, except where the shape of the relief portions 238A, 238B deviate from horizontal; those portions having the relief height measured as the shortest distance connecting the base surface 236 across the two sides of a given relief. A majority of a total length of each of the relief portions 238A is horizontally-extending along the widthwise direction. A majority of a total length of the additional relief portion 238B is horizontally-extending along the widthwise direction. The relief portion 238B can be generally trapezoidal in cross-section, as described with the relief portion 38B above. On the other hand, the relief portions 238A can have a radius of curvature R3, without flat lands, at their rearward extents. The radius R3, which can be constant or variable, is between 0.125 and 0.5 inches (3 to 13 mm) in some constructions. It should also be noted that, while FIGS. 3 and 11 are not cross-sections, but rather end views, they are equally representative of the cross-section shapes of the rear bolsters 24, 224, and their various relief portions shown, at least vertical sections taken through the taillight mounts 34, 234 or adjacent thereto.

The rear bolster 224 enjoys many or all of the benefits described with respect to the rear bolster 24. Further, the rear bolster 224 may provide additional strength and/or cost advantages. Although the rear bolster 224 may be provided with a backing plate 142 and/or gusset(s) 146 as shown in FIG. 9, these are not provided in other constructions. In either case, there are no reinforcing structures added to the rear bolster stamping on the rear-facing side (e.g., on the base surface 236).

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, one having ordinary skill in the art will appreciate that specific features of the numerous embodiments disclosed may be mixed and matched in other ways where not specifically inhibited, even though specific illustration of such embodiments may not be exhaustively covered herein.

What is claimed is:

1. A cargo transport rear frame defining a rear cargo opening, the cargo transport rear frame comprising:
    a pair of posts spaced apart in a width direction, each of the pair of posts extending in a height direction;
    an upper cross member extending along the width direction between respective upper ends of the pair of posts; and
    a rear bolster extending along the width direction between respective lower ends of the pair of posts such that the rear bolster is spaced below the upper cross member in the height direction, wherein the pair of posts, the upper cross member, and the rear bolster bound the rear cargo opening,
    wherein the rear bolster has a first side facing in a forward direction that is perpendicular to both the width and height directions, and the rear bolster has a second side facing in a rearward direction to be exposed to a rear side of the cargo transport rear frame,
    wherein the rear bolster comprises a sheet metal stamping including a base surface and a relief embossed in the rearward direction from the base surface to form a loading dock engagement feature configured to withstand repeated loading dock impacts.

2. The cargo transport rear frame of claim 1, wherein the relief includes a central portion extending laterally along the rear bolster.

3. The cargo transport rear frame of claim 2, wherein a rear end of the central portion includes a vertically oriented flat land surface.

4. The cargo transport rear frame of claim 3, wherein the central portion is trapezoidal in cross-section taken perpendicular to a length direction of the central portion.

5. The cargo transport of claim 1, wherein the loading dock engagement feature includes taillight surround portions extending at least partially around taillight mounts at outboard ends of the rear bolster in the width direction.

6. The cargo transport of claim 5, wherein a rear end of the taillight surround portions is rounded and configured to contact a loading dock.

7. The cargo transport rear frame of claim 1, wherein the stamping is from a single monolithic sheet of metal.

8. A rear bolster for a cargo transport rear frame, the rear bolster comprising:
    a sheet metal stamping including:
        a base surface having lateral outboard ends spaced in a width direction and having a top edge and a bottom edge spaced in a height direction;
        a first side facing in a forward direction that is perpendicular to both the width and height directions;
        a second side facing in a rearward direction to be exposed to a rear side of the cargo transport rear frame having the rear bolster; and
        a relief embossed in the rearward direction from the base surface to form a loading dock engagement feature configured to withstand repeated loading dock impacts.

9. The rear bolster of claim 8, wherein the relief includes a central portion extending laterally along the rear bolster.

10. The rear bolster of claim 9, wherein the relief further includes a pair of outboard portions formed continuously with the central portion, each of the pair of outboard portions extending above or below a taillight mount.

11. The rear bolster of claim 10, wherein a rear end of the central portion includes a vertically oriented flat land surface.

12. The rear bolster of claim 11, wherein a rear end of the outboard portions is rounded and configured to contact the loading dock.

13. The rear bolster of claim 12, wherein the flat land surface extends further in the rearward direction than the curved surfaces of the outboard portions.

14. The rear bolster of claim 8, wherein the stamping is from a single monolithic sheet of metal.

15. A rear bolster for a cargo transport rear frame, the rear bolster comprising:
    a sheet metal stamping including:
        a base surface having lateral outboard ends spaced in a width direction and having a top edge and a bottom edge spaced in a height direction;
        a first side facing in a forward direction that is perpendicular to both the width and height directions;
        a second side facing in a rearward direction to be exposed to a rear side of the cargo transport rear frame having the rear bolster; and
        a relief embossed in the rearward direction from the base surface to form a loading dock engagement feature configured to withstand repeated loading dock impacts, wherein the relief includes a central portion extending a first distance from the base surface in the rearward direction, and an outboard portion extending a second distance from the base surface in the rearward direction.

16. The rear bolster of claim 15, wherein the central portion extends further in the rearward direction such that the first distance exceeds the second distance by at least 0.4 inches.

17. The rear bolster of claim 16, wherein the central potion extends further in the rearward direction such that the first distance exceeds the second distance by at least 0.8 inches.

18. The rear bolster of claim 15, wherein the central portion extends further in the rearward direction such that the first distance exceeds the second distance by less than 2 inches.

19. The rear bolster of claim 18, wherein the central portion includes a vertically oriented flat land surface, and a rear end of the outboard portion of the relief is rounded.

20. The rear bolster of claim 19, wherein the central portion is trapezoidal in cross-section taken perpendicular to a length direction of the central portion.

\* \* \* \* \*